US008882970B2

(12) United States Patent
Azami et al.

(10) Patent No.: US 8,882,970 B2
(45) Date of Patent: Nov. 11, 2014

(54) APPARATUS AND METHOD FOR MANUFACTURING CARBON NANOHORNS

(75) Inventors: Takeshi Azami, Tokyo (JP); Daisuke Kasuya, Tokyo (JP); Tsutomu Yoshitake, Tokyo (JP); Yoshimi Kubo, Tokyo (JP); Masako Yudasaka, Tokyo (JP); Sumio Iijima, Tokyo (JP); Eiji Fuchita, Chiba (JP)

(73) Assignees: NEC Corporation, Tokyo (JP); Fuchita Nanotechnology Ltd., Narita-shi, Chiba (JP)

( * ) Notice: Subject to any disclaimer, the term of this patent is extended or adjusted under 35 U.S.C. 154(b) by 1278 days.

(21) Appl. No.: 12/226,570

(22) PCT Filed: Apr. 19, 2007

(86) PCT No.: PCT/JP2007/058536
§ 371 (c)(1),
(2), (4) Date: Jan. 14, 2009

(87) PCT Pub. No.: WO2007/125816
PCT Pub. Date: Nov. 8, 2007

(65) Prior Publication Data
US 2009/0301861 A1    Dec. 10, 2009

(30) Foreign Application Priority Data

Apr. 24, 2006  (JP) .................................. 2006-119088

(51) Int. Cl.
*B01J 19/12*  (2006.01)
*B82Y 40/00*  (2011.01)
(Continued)

(52) U.S. Cl.
CPC .............. *B01D 50/002* (2013.01); *B01D 45/02* (2013.01); *B01D 46/02* (2013.01); *B01D 46/48* (2013.01); *B01J 8/006* (2013.01); *B01J 19/121* (2013.01); *B82Y 30/00* (2013.01); *B82Y 40/00* (2013.01); *C01B 31/0293* (2013.01); *B01J 2219/0879* (2013.01)
USPC .................. 204/157.41; 204/157.47; 422/186

(58) Field of Classification Search
CPC ...... B01D 50/002; B01D 46/48; B01D 45/02; B01D 46/02; B01J 8/006; B01J 19/121; B01J 2219/0879; C01B 31/0293
USPC ............. 204/157.41, 157.22, 157.61, 157.47; 977/734, 742; 422/613, 186
See application file for complete search history.

(56) References Cited

U.S. PATENT DOCUMENTS 2,193,479 A * 3/1940 Donaldson ...................... 55/429
2,571,331 A * 10/1951 Blomen ........................... 55/322
(Continued)

FOREIGN PATENT DOCUMENTS

| JP | 7-187631 | 7/1995 |
| JP | 2001-64004 | 3/2001 |

(Continued)

OTHER PUBLICATIONS

PCT/IB/338. PCT/IPEA/409, (English translation).
(Continued)

*Primary Examiner* — Keith Hendricks
*Assistant Examiner* — Colleen M Raphael
(74) *Attorney, Agent, or Firm* — McGinn IP Law Group, PLLC

(57) ABSTRACT

An apparatus for manufacturing carbon nanohorns includes a production chamber configured to irradiate a solid carbon material with a laser beam to produce a product containing carbon nanohorns; and a separation mechanism configured to separate the product produced in the production chamber into a lightweight component and a heavyweight component. The heavyweight component includes carbon nanohorn aggregate with high purity, and high-purity carbon nanotubes can be obtained by collecting the heavyweight component.

25 Claims, 7 Drawing Sheets

(51) Int. Cl.
*B01D 50/00* (2006.01)
*B01D 45/02* (2006.01)
*B01D 46/02* (2006.01)
*B01D 46/48* (2006.01)
*B01J 8/00* (2006.01)
*B82Y 30/00* (2011.01)
*C01B 31/02* (2006.01)

(56) References Cited

U.S. PATENT DOCUMENTS

| | | | |
|---|---|---|---|
| 2,661,811 A * | 12/1953 | Kautz | 55/282.1 |
| 2,886,518 A * | 5/1959 | Schulman et al. | 422/198 |
| 2,935,158 A * | 5/1960 | Braun | 96/395 |
| 4,714,541 A * | 12/1987 | Buyan et al. | 55/459.1 |
| 4,764,191 A * | 8/1988 | Morelli | 55/302 |
| 5,300,203 A * | 4/1994 | Smalley | 204/157.41 |
| 5,454,945 A * | 10/1995 | Spearman | 210/315 |
| 5,876,684 A * | 3/1999 | Withers et al. | 204/157.41 |
| 5,972,059 A * | 10/1999 | Morgan | 55/336 |
| 6,251,296 B1 * | 6/2001 | Conrad et al. | 55/307 |
| 6,254,928 B1 * | 7/2001 | Doan | 204/157.41 |
| 6,569,217 B1 * | 5/2003 | DeMarco | 55/324 |
| 6,887,291 B2 | 5/2005 | Alford et al. | |
| 6,936,233 B2 * | 8/2005 | Smalley et al. | 977/845 |
| 2003/0041732 A1 | 3/2003 | Alford et al. | |
| 2004/0057896 A1 * | 3/2004 | Kronholm et al. | 422/171 |
| 2005/0129608 A1 * | 6/2005 | Takehara et al. | 423/445 B |
| 2007/0116632 A1 * | 5/2007 | Harutyunyan | 423/447.3 |

FOREIGN PATENT DOCUMENTS

| | | |
|---|---|---|
| JP | 2002-234715 | 8/2002 |
| JP | 2003-20215 | 1/2003 |
| JP | 2003-246613 | 9/2003 |
| JP | 2004/19018 | 1/2004 |
| JP | 2005-501789 | 1/2005 |
| JP | 2005-350275 | 12/2005 |
| JP | 2005-350349 | 12/2005 |
| WO | WO 03/020402 | 3/2003 |
| WO | WO 2004/103902 | 12/2004 |
| WO | WO 2005/014476 | 2/2005 |

OTHER PUBLICATIONS

Azami, Takeshi, et al. "The 32nd Fullerene-Nanotubes General Symposium", Production of single-wall carbon nanohorns with high purity, vol. 13, Feb. 2007, p. 149.

Zhang, M., et al. Isolating Single-Wall Carbon Nanohorns as Small Aggregates through a Dispersion Method, J. Phys. Chem. B., 2005, vol. 109, No. 47, pp. 22201-22204.

* cited by examiner

APPARATUS AND METHOD FOR MANUFACTURING CARBON NANOHORNS

TECHNICAL FIELD

The present invention relates to an apparatus and a method for manufacturing carbon nanohorns, and more particularly to an apparatus and a method for manufacturing carbon nanohorns, which are capable of collecting high purity carbon nanohorns.

BACKGROUND ART

A carbon nanohorn is a material having a hollow cone-shaped structure in which a tip of a tube formed of a single layer of a graphene sheet is closed, i.e., a horn-shaped structure. In general, the carbon nanohorns can be obtained as spherical aggregates in each of which a number of carbon nanohorns are aggregated with the tips thereof facing outside (see, for example, Japanese Laid-Open Patent Application JP-P 2003-20215A). The carbon nanohorn has a diameter of approximately 2 to 5 nm, and the aggregate has a diameter of approximately 50 to 150 nm. The carbon nanohorn aggregate is characterized in that a surface thereof has a very irregular structure, and therefore expected to be applied as a catalyst support or gas absorbent.

Methods for manufacturing carbon nanohorns include a laser ablation method, an arc discharge method, and the like. Among them, the laser ablation method is a method in which a target made of carbon such as graphite is irradiated with a carbon dioxide gas laser in inert gas such as argon gas, and can manufacture relatively high purity carbon nanohorns (see, for example, Japanese Laid-Open Patent Application JP-P 2005-350275 A and JP-P 2005-350349 A).

Collection of manufactured products containing carbon nanohorns can be carried out by a method in which the products are deposited on an appropriate substrate for collection, a particulate collecting method by a dust bag, a method in which inert gas is circulated in a reaction container to collect the products by a flow of the inert gas, or the like (see, for example, Japanese Laid-Open Patent Application JP-P 2001-064004 (particularly, see paragraph [0018]).

The collection of the products containing carbon nanohorns may also be carried out with the use of a filter provided in an inert gas circulating path or the like connected to a reaction chamber (see, for example, Japanese Laid-Open Patent Application JP-P 2002-234715 A, and National publication of translated version of PCT Application JP-P2005-501789A. In addition, the products deposited onto an inner wall surface of the reaction chamber are collected by being scraped with a scraper (see, for example, Japanese Laid-Open Patent Application JP-P 2002-234715 A).

DISCLOSURE OF INVENTION

A degree of purity of the carbon nanohorns (products) obtained by the conventional manufacturing methods are approximately 90% or less based on an estimate by TGA (Thermogravimetric Analysis) and TEM (Transmission Electron Microscope) observations. Specifically, the products produced by the conventional manufacturing methods contain graphite of approximately 10% and amorphous carbon of approximately a few % as impurities.

To use carbon nanohorns as catalyst supports for fuel cell or raw material for composite material, or in a variety of other industrial fields, it is desirable to eliminate the impurities such as a graphite component and an amorphous component as much as possible to thereby improve the degree of purity of carbon nanohorns.

As a technique for improving a degree of purity of carbon nanohorns, a method is known in which thermal treatment is executed in an oxygen atmosphere after manufacture. This method is one in which carbon nanohorns (product) are thermally treated at approximately 500° C. in the oxygen atmosphere to thereby burn and eliminate the amorphous component. However, this method cannot eliminate the graphite component having a higher burning temperature than that for carbon nanohorns in the oxygen atmosphere, and therefore cannot easily improve the degree of purity to 90% or more.

Accordingly, an object of the present invention is to provide a manufacturing apparatus and a manufacturing method capable of collecting high purity carbon nanohorns in which a graphite component and an amorphous component are reduced.

An apparatus for manufacturing carbon nanohorns according to the present invention includes: a production chamber configured to irradiate a solid carbon material with a laser beam to produce a product containing carbon nanohorns; and a separation mechanism configured to separate the product produced in the production chamber into a lightweight component and a heavyweight component.

Preferably, the separation mechanism may include a collection chamber configured to be connected to the production chamber through a transfer pipe. Here, the collection chamber may be provided with an exhaust port provided above a collection chamber side outlet of the transfer pipe.

Preferably, the production chamber may be provided with an inert gas inlet for introducing inert gas into the production chamber.

Preferably, a filter may be configured to be provided between the collection chamber side outlet of the transfer pipe and the exhaust port inside the collection chamber. Also preferably, a filter appendage for increasing a surface area of the filter may be configured to be attached to the filter. Further preferably, the filter may be cone-shaped.

Preferably, a collection port for collecting the product deposited on the bottom wall portion may be provided at a bottom wall portion of the collection chamber.

Preferably, the collection chamber may include a scraping mechanism configured to scrape the product deposited on the bottom wall portion down into the collection port. Also preferably, the scraping mechanism may include a scraping plate configured to be attached so as to rotate around a rotational axis along a vertical direction with being in contact with the bottom wall portion.

Preferably, the collection chamber may be of a cylindrical shape having a central axis along the vertical direction.

Preferably, the collection chamber side outlet of the transfer pipe may be arranged such that gas discharged from the collection chamber side outlet spirally moves up in the collection chamber.

Preferably, the apparatus for manufacturing carbon nanohorns according to the present invention may further include an exhaust mechanism configured to be connected to the exhaust port and exhaust the collection chamber.

Preferably, a method for manufacturing carbon nanohorns according to the present invention includes: producing a product containing carbon nanohorns by irradiating a solid carbon material with a laser beam; separating the product into a lightweight component and a heavyweight component; and collecting the separated heavyweight component.

Preferably, the separation step may include an introduction step of introducing the product into a collection chamber, which is provided with an exhaust port, from the lower side of the exhaust port.

Preferably, the separation step may include a step of making the product flow along a flow of inert gas, and in the introduction step, the product flowing along the flow of the inert gas may be introduced into the collection chamber. Also preferably, the inert gas may be argon gas.

Preferably, inside the collection chamber, the filter may be provided below the exhaust port, and in the separation step, the product may be introduced into the collection chamber from the lower side of the filter. Also preferably, the filter may be cone-shaped.

Preferably, in the collection step, the heavyweight component may be collected from a collection port provided in a bottom wall portion of the collection chamber.

Preferably, the collection chamber may include a scraping mechanism configured to scrape the product deposited on the bottom wall portion down into the collection port, and in the collection step, the scraping mechanism may be driven to thereby scrape the product down into the collection port. Also preferably, the scraping mechanism may include a scraping plate configured to be attached so as to rotate around a rotational axis along a vertical direction with being in contact with the bottom wall portion. Further preferably, the collection chamber may be of a cylindrical shape having a central axis along the vertical direction.

Preferably, in the separation step, the product may be introduced into the collection chamber so as to spirally move up in the collection chamber.

Preferably, in the production step, a solid material only made of carbon may be irradiated with the laser beam in an inert gas atmosphere.

Preferably, the separation step may include a step of exhausting the collection chamber.

Another exemplary embodiment of the apparatus for manufacturing carbon nanohorns according to the present invention is one in which, by irradiating a solid carbon material with a laser beam in an inert gas atmosphere to evaporate carbon, product containing carbon nanohorns is produced. This apparatus for manufacturing carbon nanohorns includes: a production chamber configured to produce the product; a collection chamber configured to be connected to the production chamber through a transfer pipe; and a filter configured to be provided in the collection chamber. By adsorbing the product having a high content of component other than carbon nanohorns onto the filter, the product having a high content of carbon nanohorns can be separated.

Preferably, a collection chamber side outlet of the transfer pipe may be provided at an eccentric position in a lower portion of the collection chamber such that inert gas discharged from the collection chamber side outlet spirally moves up along an inner peripheral wall of the collection chamber.

Preferably, a bottom wall portion of the collection chamber may be provided with: a collection port for collecting the product; and a scraping plate for scraping the product deposited on the bottom wall portion down into the collection port with being in contact with the bottom wall portion.

Another exemplary embodiment of the method for manufacturing the carbon nanohorns according to the present invention is one in which, by irradiating a solid material only made of carbon with a laser beam in an inert gas atmosphere in a production chamber to evaporate carbon, product containing carbon nanohorns is produced; the product is transferred to a collection chamber with an inert gas flow flowing from the production chamber to the collection chamber through a transfer pipe; the product having a high content of graphite component is adsorbed onto a filter in the collection chamber; and the product deposited in the collection chamber excluding the filter is collected.

Preferably, the collection of the product may be carried out in such a way that a scraping plate provided with being in contact with a bottom wall portion of the collection chamber is rotationally driven to scrape the product deposited on the bottom wall portion down into a collection port formed in the bottom wall portion.

Still another exemplary embodiment of the apparatus for manufacturing carbon nanohorns according to the present invention includes: a production chamber configured to irradiate a solid material only made of carbon with a laser beam in inert gas atmosphere to produce a product; and a separation means configured to separate the product into a first product component having a high content of a relatively light component and a second product component having a high content of a relatively heavy component with transferring the product with use of a gas flow.

Preferably, the separation means may include: a collection chamber configured to collect the product; and a transfer pipe configured to makes a connection between the collection chamber and the production chamber and transfers the product from the production chamber to the collection chamber by flowing the inert gas from the production chamber to the collection chamber.

Also, preferably, an exhaust port for exhausting the collection chamber may be provided in an upper portion of the collection chamber, and a collection chamber side outlet of the transfer pipe may be provided in a lower portion of the collection chamber.

Further, preferably, the collection chamber may be of a cylindrical shape having the central axis along a vertical direction, and the collection chamber side outlet of the transfer pipe may be eccentrically provided such that the gas flow spirally moves up along the inner peripheral wall of the collection chamber.

Preferably, in the upper portion of the collection chamber, a filter, preferably a cone-shaped filter, for collecting the first product component may be provided.

Still another exemplary embodiment of a method for manufacturing carbon nanohorns according to the present invention includes the steps of: irradiating a solid material only made of carbon with a laser beam in an inert gas atmosphere to produce a product; generating a gas flow containing the product by using the inert gas; depositing the product contained in the gas flow; and collecting the product deposited in a specific area determined based on a path of the gas flow.

Preferably, in this method for manufacturing carbon nanohorns, the step of producing the product may be carried out in a production chamber; the inert gas may be supplied into the production chamber and at a same time a collection chamber connected to the production chamber through a transfer pipe is exhausted to generate the gas flow for transferring the product produced in the production chamber into the collection chamber; and the product contained in the gas flow may be deposited in the collection chamber.

Also, preferably, it may be configured such that the gas flow is made to spirally move from bottom to top along the inner peripheral wall of the collection chamber; the product reaching the upper portion of the collection chamber is adsorbed onto a filter to be eliminated; and the product deposited on a bottom wall portion of the collection chamber is collected.

According to the present invention, upon collection of the product produced in the production chamber, using the gas flow to transfer the product to another place for deposition, the product component having a high content of relatively heavy component (including carbon nanohorns) and the product component having a high content of relatively light component (having few carbon nanohorns) can be easily separated. Then, only collecting the product having the high content of relatively heavy component enables high purity carbon nanohorns to be obtained without passing through a purification process.

That is, according to the present invention, there can be provided the apparatus and method for manufacturing carbon nanohorns, which are capable of easily eliminating impurities, i.e., a graphite component and an amorphous component, with the use of the gas flow, and simply manufacturing high purity carbon nanohorns.

BEST MODE FOR CARRYING OUT THE INVENTION

Figure 1:
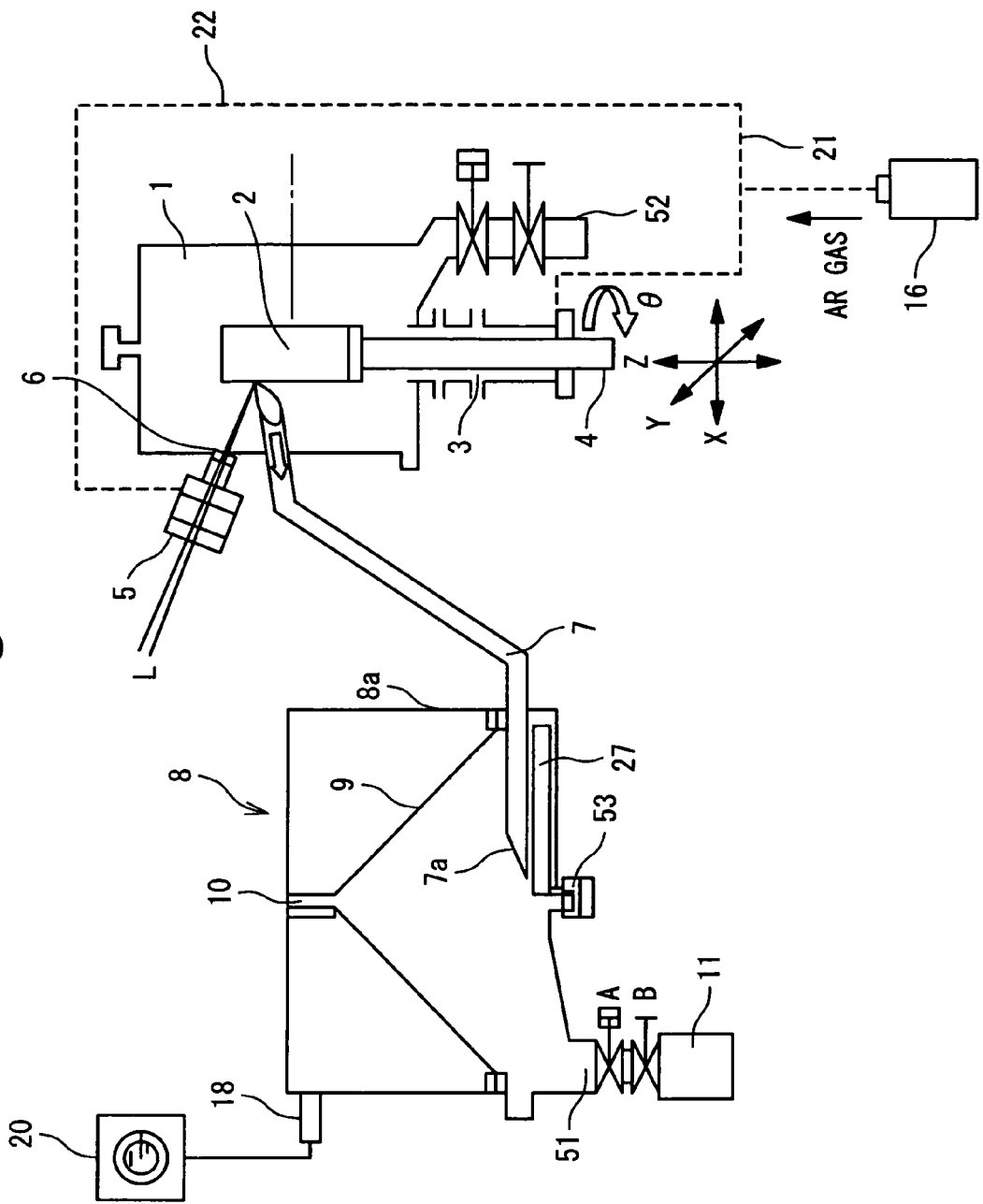
FIG. 1 is a schematic configuration diagram of an apparatus of manufacturing carbon nanohorns according to a first exemplary embodiment of the present invention.

The best mode for carrying out the present invention will hereinafter be described referring to the drawings.

The present invention uses a feature that carbon nanohorn is characterized by being likely to be aggregated as compared with a graphite component and an amorphous component. A carbon nanohorn aggregate has a higher mass as compared with powders of graphite, amorphous carbon, and the like. Accordingly, if a mixture of them is blown out with a gas flow, the powders of graphite, amorphous carbon, and the like are blown far whereas the carbon nanohorn aggregate is not blown far but drops nearby. The present invention uses such phenomenon to separate carbon (soot-like material) evaporated by irradiating a solid material only made of carbon with a laser beam in an inert gas atmosphere into two product components.

(First Exemplary Embodiment)

FIG. 1 is a schematic diagram illustrating a basic configuration of an apparatus for manufacturing carbon nanohorns according to a first exemplary embodiment of the present invention.

The manufacturing apparatus in FIG. 1 is an apparatus for manufacturing carbon nanohorns by irradiating a solid material only made of carbon with a laser beam in an inert gas atmosphere to evaporate carbon. This apparatus includes a production chamber 1 for producing carbon nanohorns and a collection chamber 8 which is connected to the production chamber 1 through a transfer pipe 7.

The production chamber 1 is provided with a support rod 3 for supporting a graphite target 2 that is the solid material only made of carbon. Also, in a lower portion of the support rod 3, a drive unit 4 is provided. The drive unit 4 moves the graphite target 2 in X, Y, and Z axis directions (right-and-left, back-and-front and, up-and-down directions in the drawing) by driving the support rod 3. Also, the drive unit 4 can use the Z-axis as a rotation axis to rotate the target 2.

Also, the production chamber 1 includes a laser irradiation window (for example, a window made of ZnSe) for irradiating the target 2 in the production chamber 1 with the laser beam L from an un-shown laser oscillator (for example, a carbon dioxide gas laser oscillator). The laser irradiation window is provided with a laser focus position adjustment mechanism 5 for focusing the laser beam on a predetermined position.

Further, the production chamber 1 is connected with gas pipelines 21 and 22. The gas pipelines 21 and 22 are for introducing inert gas (for example, Ar gas) into the production chamber 1, and connected to a gas canister 16. Also, the gas pipeline 21 is connected to a gas inlet around the lower portion of the support rod 3, and the gas pipeline 22 is connected to a gas discharge nozzle 6 provided in the laser irradiation window.

Furthermore, a rotary pump 52 for evacuating the production chamber 1 is attached to the production chamber 1 through a valve.

The collection chamber 8 includes, in the center of an upper wall portion thereof, a filter hanging jig 10 for hanging a filter (for example, a bag filter) 9. The collection chamber 8 includes a cylindrical peripheral wall portion 8a. The filter 9 is formed in a cone shape, and hung such that a lower edge thereof is brought into contact with an inner wall of the collection chamber 8.

Also, the collection chamber 8 includes, in a bottom wall portion thereof, a collection port 51 for collecting carbon nanohorn product; a scraping plate 27 for scraping carbon nanohorns deposited on the bottom wall portion to drop them into the collection port 51; and a motor 53 for rotationally driving the scraping plate 27. The motor 53 has a drive shaft parallel to the Z-axis (up-and-down direction in the drawing) in the center of the bottom wall portion of the collection chamber 8, and rotationally drives the scraping plate 27 with the scraping plate 27 being in contact with the bottom wall portion of the collection chamber 8. Also, a collection container 11 is attached to the collection port 51 through a valve.

Further, the collection chamber 8 has an exhaust port 18 provided in an upper portion of the peripheral wall portion 8a. The exhaust port 18 is connected to an exhaust mechanism (for example, a dry pump) 20 for evacuating the collection chamber 8.

The transfer pipe 7 making the connection between the production chamber 1 and the collection chamber 8 is for transferring the carbon nanohorn product produced in the production chamber 1 to the collection chamber 8. For this purpose, an end of the transfer pipe 7 on the production chamber side is provided around a laser irradiation portion of the graphite target 2. In other words, the laser irradiation to the target 2 is carried out around the production chamber side end of the transfer pipe 7. On the other hand, a collection chamber side end (outlet) 7a of the transfer pipe 7 is provided in a lower portion (near the bottom wall portion) of the collection chamber 8 with being eccentric from a chamber centerline (such that the outlet faces a tangential direction) and not obstructing the scraping plate 27 from moving.

Next, an operation of the manufacturing apparatus in FIG. 1 will be described.

When the target 2 is irradiated with the laser beam in the inert gas atmosphere to evaporate carbon in the production chamber 1, the product containing carbon nanohorns is produced. At this time, if the collection chamber 8 is evacuated with the inert gas being introduced into the production chamber 1 (i.e., if a pressure inside the collection chamber 8 is made lower than that inside the production chamber 1), a flow of the inert gas through the transfer pipe 7 can be generated. The production chamber side end of the transfer pipe 7 is, as described above, provided around a laser irradiation portion of the graphite target 2, and therefore the product containing carbon nanohorns, which is produced in the production chamber 1, is transferred to the collection chamber 8 by the inert gas flow.

Figure 2:
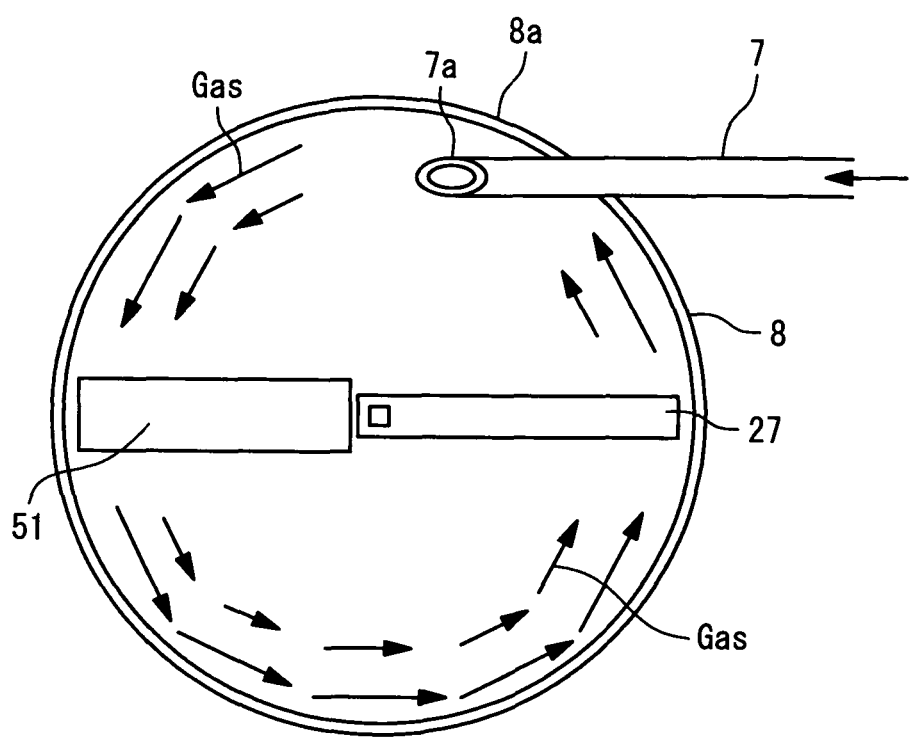
FIG. 2 is a cross-sectional view around a bottom wall portion of a collection chamber in FIG. 1, for describing a flow of inert gas in the collection chamber.

Also, the collection chamber side outlet 7a of the transfer pipe 7 is eccentrically provided in the lower portion of the collection chamber 8 whereas the exhaust port 18 is provided in the upper portion, and therefore the inert gas flowed into the collection chamber 8 through the transfer pipe 7 moves upward while traveling along the inner peripheral wall of the collection chamber 8 as illustrated in FIG. 2. That is, the inert gas flowed into the collection chamber 8 spirally flows from bottom to top. The inert gas having reached an upper portion of the collection chamber 8 is exhausted outside from the exhaust port 18 through the filter 9.

The product component having reached the upper portion of the collection chamber 8 with the inert gas flow, which is a part of the carbon nanohorn product having been transferred to the collection chamber 8 by the inert gas, is trapped by the filter 9. The other product component not having been able to reach the upper portion of the collection chamber 8 with the inert gas flow is deposited on the bottom wall portion of the collection chamber 8, or on the inner peripheral wall of the collection chamber 8.

Powder transferred to the collection chamber 8 through the transfer pipe 7 contains carbon nanohorns, graphite component, and amorphous component. Among them, large portions of the graphite component and the amorphous component, each of which is relatively unlikely to be aggregated and has a low mass reach the filter 9, move upward with the inert gas flow moving upward in the collection chamber 8, and are then trapped by the filter 9. On the other hand, carbon nanohorns tends to be aggregated, and the aggregated carbon nanohorn powder has a higher mass, so that the aggregated powder cannot reach the filter 9, and therefore drops and is deposited onto the bottom wall portion of the collection chamber 8.

In the present exemplary embodiment, the gas flow moves up with spiraling along the inner peripheral wall of the collection chamber 8. In this case, as compared with a case where the gas flow linearly moves up, the aggregation of carbon nanohorns can be facilitated. As a result, a degree of purity of carbon nanohorns that are product dropping onto the bottom wall portion of the collection chamber 8 can be further increased.

Subsequently, when the motor 53 is driven to rotate the scraping plate 27, the product component deposited on the bottom wall portion of the collection chamber 8 is scraped together, and then gathered in the collection port 51. The product component gathered in the collection port 51 is collected into the sample collection container 11 through the valve.

In the above manner, the manufacturing apparatus according to the present exemplary embodiment can separate the product into the product component having a high content of impurities and the product component having a high content of carbon nanohorns with the gas-flow-based simple mechanism using the transfer pipe 7 and the collection chamber 8 as a separation means. This enables high purity carbon nanohorns to be easily obtained.

(Second Exemplary Embodiment)

Figure 3:
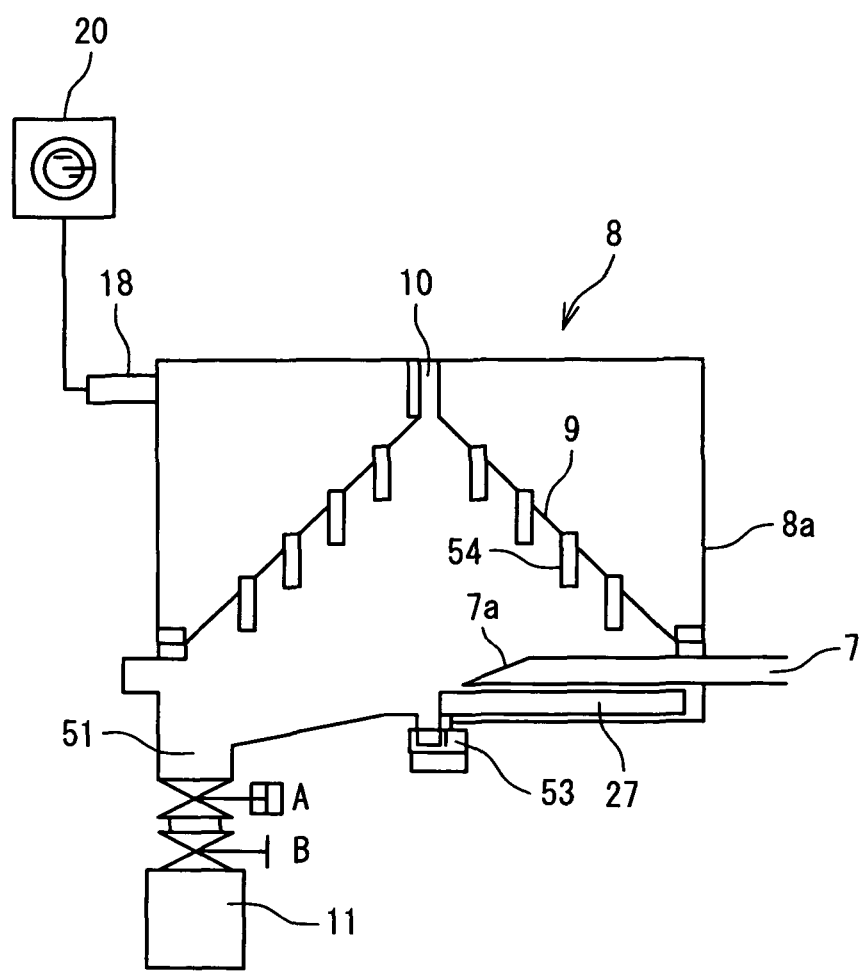
FIG. 3 is a schematic configuration diagram of a collection chamber included in the apparatus for manufacturing carbon nanohorns according to another exemplary embodiment of the present invention.

Next, an apparatus for manufacturing carbon nanohorns according to a second exemplary embodiment of the present invention is described referring to FIG. 3.

The manufacturing apparatus according to the present exemplary embodiment is essentially the same as that illustrated in FIG. 1. However, as illustrated in FIG. 3, it is devised in the way that the filter 9 is provided with filter appendages 54 made of the same material as that for the filter 9.

The filter appendage 54 is for efficiently trapping the powder carried with the gas flow spirally moving up, and may be formed into a shape for increasing trap efficiency, for example, a blind shape.

The manufacturing apparatus according to the present exemplary embodiment can trap with high efficiency powder having a high content of impurities carried to the upper portion of the collection chamber 8 by the gas flow, and therefore can further increase a degree of purity of carbon nanohorns to be collected with high efficiency.

(Example 1)

An example where the manufacturing apparatus illustrated in FIG. 1 was used to manufacture carbon nanohorns will be described.

First, the graphite target 2 (length of 500 mm, and irradiation effective length of 450 mm) was placed in the production chamber 1, and then the production chamber 1 was evacuated with the rotary pump 52.

Subsequently, argon gas was introduced as the inert gas into the production chamber 1 from the gas canister 16. The argon gas was introduced from the gas inlet in the lower portion of the support rod 3 and the gas discharge nozzle 6. A total flow rate of the gas introduced through both of the gas inlet and the gas discharge nozzle was set to 105 L/min.

Further, the dry pump 20 connected to the gas exhaust pipe 18 of the collection chamber 8 was driven to exhaust the collection chamber 8. Based on this, the argon gas introduced into the production chamber 1 was brought into a state capable of flowing into the collection chamber 8 through the transfer pipe 7 and being exhausted outside the collection chamber 8 from the gas exhaust pipe 18 through the filter 9.

As described above, with the argon gas flow being generated, a circumferential surface of the graphite target 2 was irradiated with the carbon dioxide gas laser beam L focused with a lens. A wavelength and power of the carbon dioxide gas laser beam L were set to 10.6 μm and 3.5 kW, respectively. When the laser beam L was irradiated, plume (emission) was produced from the surface of the target 2, and carbon was evaporated. The evaporant (product) contains, in addition to carbon nanohorns, a graphite component and an amorphous component.

Along with the argon gas flow, the evaporant produced in the production chamber 1 flowed into the transfer pipe 7 that was installed in a direction having a 45-degree angle with respect to an incident direction of the laser beam L. The evaporant moving in the transfer pipe 7 was introduced into the collection chamber 8 from the collection chamber side end 7a of the transfer pipe 7.

As described referring to FIG. 2, the evaporant introduced into the collection chamber 8 from the collection chamber side end 7a flows along the argon gas flow that moves upward with spiraling along the inner peripheral wall of the collection chamber 8, and spirally moves up from the lower portion to the upper portion of the collection chamber 8. At this time, among components contained in the evaporant, the graphite component and the amorphous component that are unlikely to be aggregated and have low masses reach the filter 9 located above, and large portions of them are trapped by the filter 9. On the other hand, among the components contained in the evaporant, a portion of carbon nanohorns reaches the filter 9 and is then trapped. However, carbon nanohorns are likely to be aggregated, and therefore before reaching the filter 9, a large portion of carbon nanohorns form into aggregates, which then drop and are deposited onto the bottom wall portion of the collection chamber 8.

The deposit deposited on the bottom wall portion of the collection chamber 8 in the above manner contains high purity carbon nanohorns. The deposit (high purity carbon nanohorn powder) was scraped together into the collection port 51 by rotationally driving the scraping plate 27 with the motor 53, and then collected in the sample collection container 11 arranged below the collection port 51.

Note that, after completion of the laser beam irradiation onto the target 2 followed by the collection of the deposit (high purity carbon nanohorn powder) deposited on the bottom wall portion of the collection chamber 8, the powder (impurities) having high contents of a graphite component and an amorphous component, which had been trapped by the filter 9, was collected separately from the high purity carbon nanohorns. This is for enabling to manufacture next carbon nanohorns using a new target to be carried out.

The collection of the impurities was carried out in the same manner as the collection of the high purity carbon nanohorn powder after the bag filter 9 had been mechanically vibrated to drop the trapped powder onto the bottom wall portion of the collection chamber 8. That is, the powder was gathered in the collection port 51 by rotating the scraping plate 27, and then collected in an impurity collection container arranged below the collection port 51, which was different from the sample collection container 11.

Figure 4:
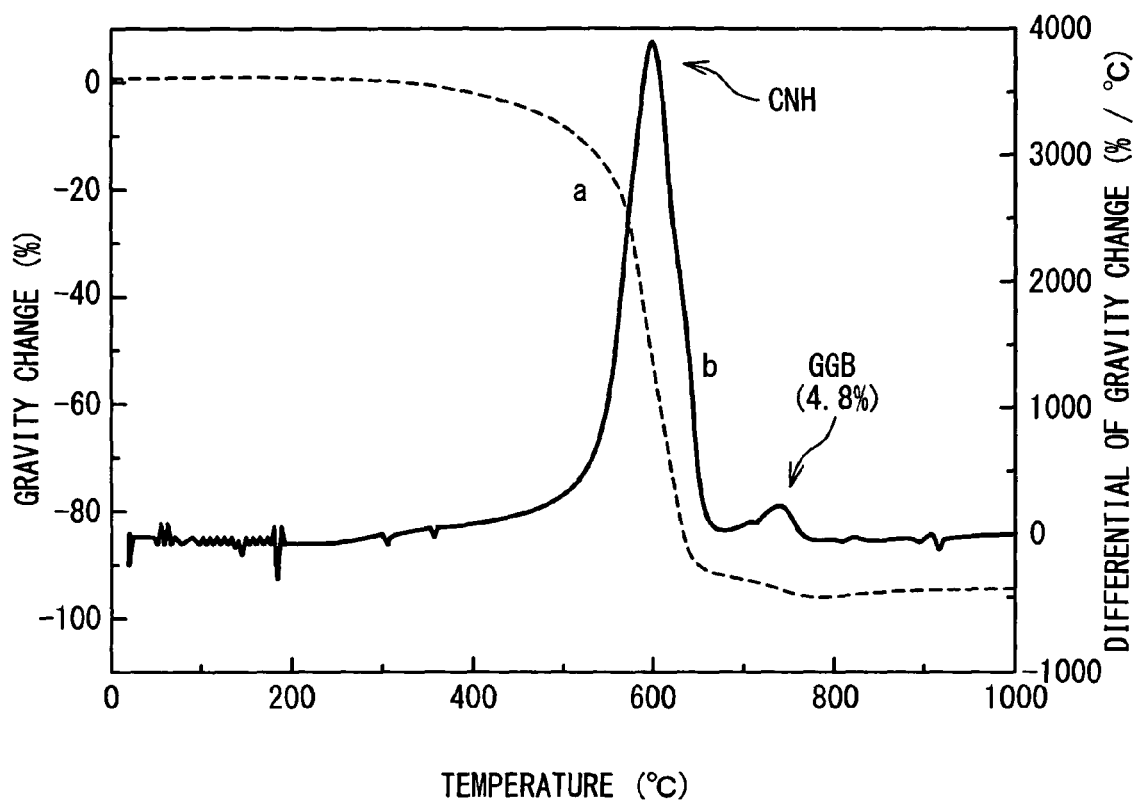
FIG. 4 is a graph illustrating a TGA measurement curve of high purity carbon nanohorn powder collected in an example 1.

A TGA measurement result of the high-purity carbon nanohorn powder manufactured in the above manner is illustrated in FIG. 4.

(Example 2)

Figure 5:
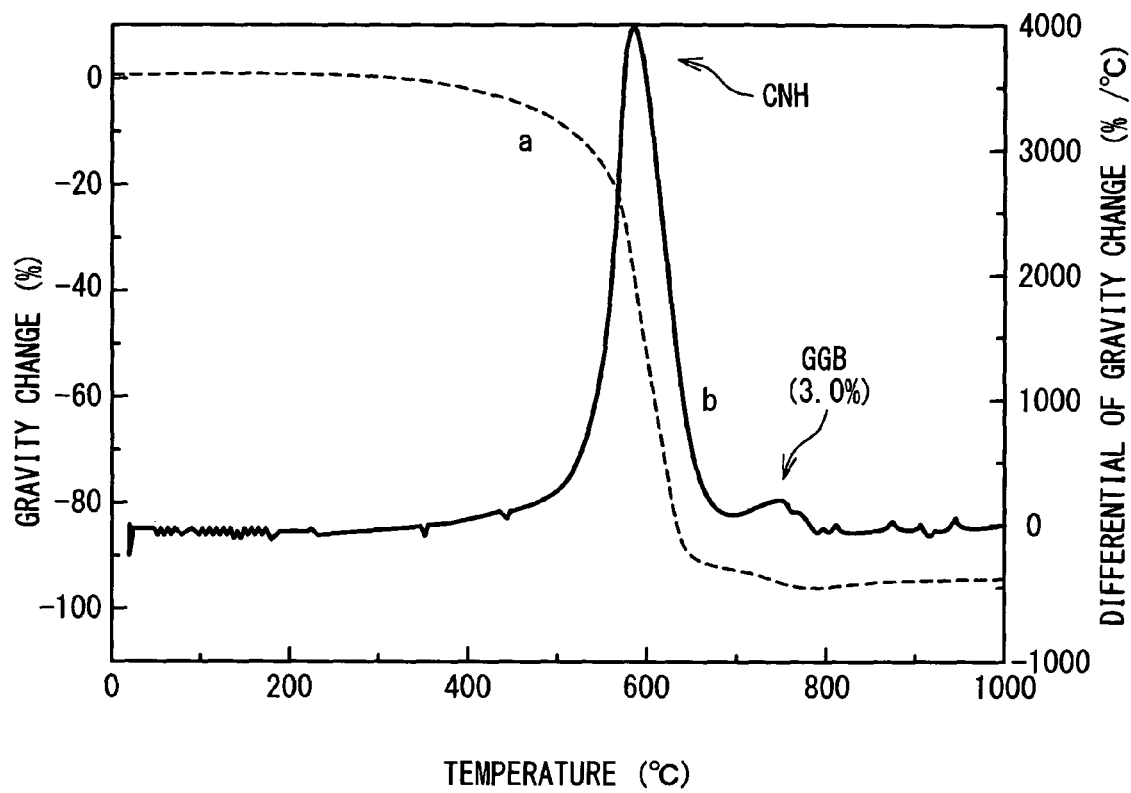
FIG. 5 is a graph illustrating a TGA measurement curve of high purity carbon nanohorn powder collected in an example 2.

The apparatus for manufacturing the carbon nanohorns including the filter 9 provided with the filter appendage 54 illustrated in FIG. 3 was used to manufacture carbon nanohorns in the same manner as in the Example 1. A TGA result of the obtained high purity carbon nanohorn powder is illustrated in FIG. 5.

(Comparative Example)

Figure 6:
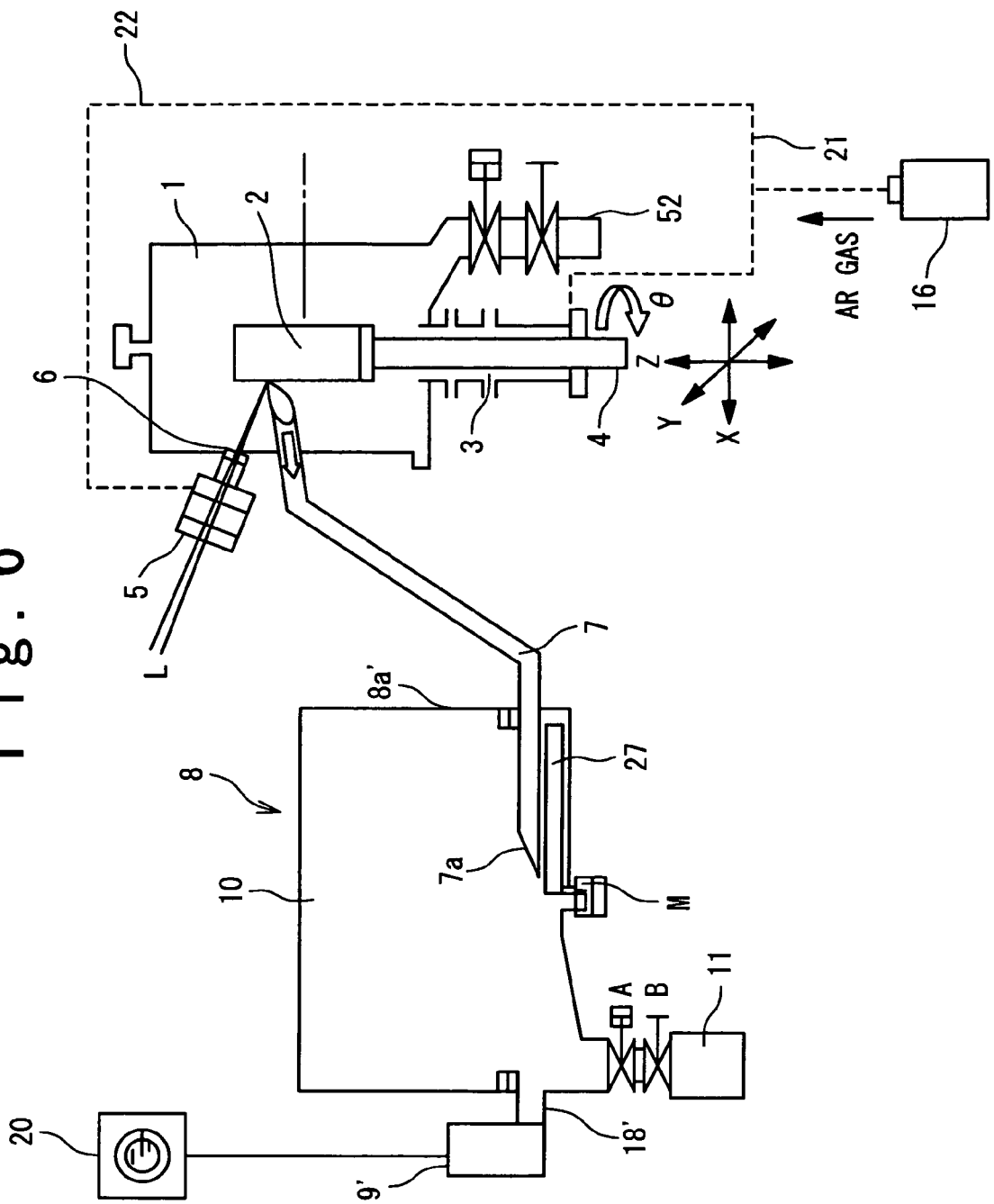
FIG. 6 is a schematic configuration diagram of an apparatus for manufacturing carbon nanohorns used for manufacturing carbon nanohorn powder as a comparative example.

As a comparative example, a manufacturing apparatus illustrated in FIG. 6 was used to manufacture carbon nanohorns.

The manufacturing apparatus illustrated in FIG. 6 is different from that illustrated in FIG. 1 in the way that an exhaust port 18' of a collection chamber 8' is provided in a lower portion of a peripheral wall portion 8a', and a filter 9' is attached into the exhaust port 18'.

Carbon nanohorns were manufactured in the same manner as in the Example 1. Also in the comparative example, product deposited on a bottom wall portion of the collection chamber 8' was collected as carbon nanohorn powder, separately from the product trapped by the filter 9'. A TGA measurement result of the obtained carbon nanohorn powder is illustrated in FIG. 7.

(Discussion of Results)

Figure 7:
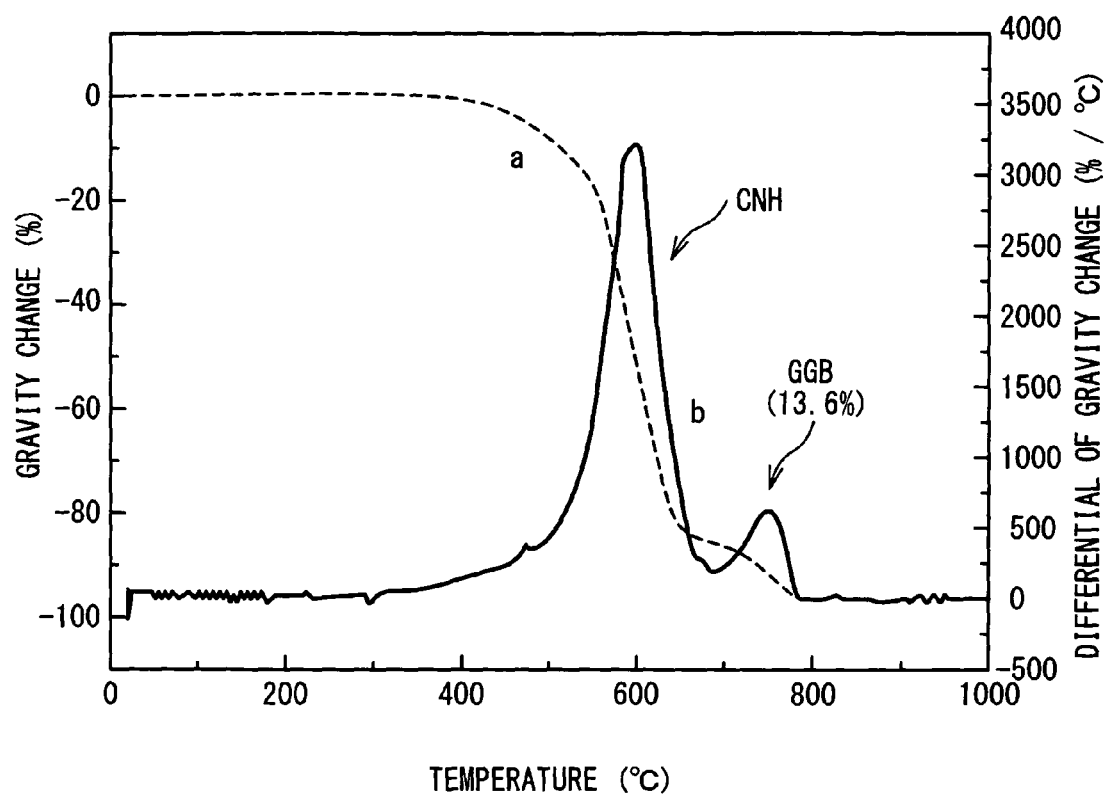
FIG. 7 is a graph illustrating a TGA measurement curve of the carbon nanohorn powder collected in the comparative example.

In FIGS. 4, 5, and 7, broken lines "a"s indicate changes in weight, and solid lines "b"s indicate differential curves of the changes in weight. In the TGA curves, large decreases in weight around 500 to 650° C. correspond to burning of carbon nanohorns, decreases in weight around 700 to 800° C. correspond to burning of the graphite component, and slight decreases in weight around 400 to 500° C. correspond to burning of the amorphous component.

Referring to FIG. 7, a significant weight change is observed around 700 to 800° C. It turns out from this that the carbon nanohorn powder in the comparative example contains the graphite component of 10% or more. Also, besides this, it turns out from the weight change at 500° C. or below that the carbon nanohorn powder in the comparative example contains the amorphous component of approximately a few %.

In addition, upon manufacture in the comparative example, the TGA curve was also obtained for the powder trapped by the filter 9'. However, a result of it was almost the same as that illustrated in FIG. 7. That is, carbon nanohorns contained in the powder trapped by the filter 9' was approximately 90% or less.

It turns out from a comparison between FIGS. 7 and 4 that the weight change around 700 to 800° C. in FIG. 4 is smaller than that in FIG. 7, and a content of the graphite component is approximately 5% or less in FIG. 4. Further, a content of the amorphous component burned at 500° C. or less is also decreased in FIG. 4. From these outcomes, it turns out that, by using the apparatus for manufacturing carbon nanohorns of the example 1, high purity carbon nanohorns with having a degree of purity of 95% or more was manufactured.

Note that, as the result of the TGA measurement of the powder that was trapped by the filter 9 and collected, it was recognized that the powder contained the graphite component of approximately 30% and the amorphous component of approximately 5%. That is, it was recognized that, in the manufacturing apparatus of the example 1, the graphite component and the amorphous component were effectively trapped by the filter 9 located in the upper portion of the chamber.

Also, referring to FIG. 5, the weight change around 700 to 800° C. is smaller even as compared with FIG. 4, and therefore it turns out that the high purity carbon nanohorn powder in the example 2 has a content of graphite component of 3% or less. Also, it turns out that a content of the amorphous component burned at 500° C. or less is further decreased. From these outcomes, it was recognized that, in the example 2, by providing the filter appendages 54, carbon nanohorns could be manufactured with a higher purity (approximately 97%) than that in the example 1.

As shown above, the present invention has been described according to the several exemplary embodiments and examples. However, it should be appreciated that the present invention is not limited to such exemplary embodiments or examples, but may be varied on the basis of the technical idea of the present invention.

For example, in the above exemplary embodiments, argon gas is used as the inert gas. However, it should be appreciated that, without limitation to this, the other inert gas, for example, nitrogen or helium gas may be used.

The invention claimed is:

1. An apparatus for manufacturing carbon nanohorns, the apparatus comprising:

a production chamber configured to irradiate a solid carbon material with a laser beam in an atmosphere of inert gas to produce a product comprising:
  carbon nanohorns;
  a graphite component; and
  an amorphous component; and
a separation mechanism configured to separate said carbon nanohorns from said graphite component and said amorphous component,
wherein said separation mechanism includes:
  a collection chamber configured to be connected to said production chamber through a transfer pipe such that said product is introduced by using said inert gas into said collection chamber from said production chamber through the transfer pipe,
  a trapping mechanism configured to be provided at an upper portion of said collection chamber,
  a collection mechanism configured to be provided at a lower portion of said collection chamber, and
  an exhaust port configured to be provided above a collection chamber side outlet of said transfer pipe,
wherein said trapping mechanism includes:
  a cone-shaped filter configured to be provided between said collection chamber side outlet and said exhaust port and to be inside said collection chamber, the cone-shaped filter being arranged in a direction where a vertex of a cone of said cone-shaped filter is upward,
wherein said collection mechanism includes:
  a collection port configured to be provided at a bottom wall portion of said collection chamber,
wherein said collection chamber is connected to said production chamber such that said inert gas spirally moves up in said collection chamber,
wherein said inert gas including said product flows into an inside of said cone-shaped filter in a direction eccentric from a centerline of said cone, and spirally flows from a bottom of said cone-shaped filter to a top of said cone-shaped filter through the inside of said cone-shaped filter,
wherein said trapping mechanism traps said graphite component and said amorphous component moving up with said inert gas in said collection chamber,
wherein said collection mechanism collects said carbon nanohorns spirally moving up with said inert gas, said carbon nanohorns being aggregated and dropped in said collection chamber, and
wherein said separation mechanism separates said carbon nanohorns from said graphite component and said amorphous component based on a traveled distance of said carbon nanohorns against a gravitational force.

2. The apparatus for manufacturing carbon nanohorns according to claim 1, wherein said production chamber is provided with an inert gas inlet for introducing said inert gas into said production chamber.

3. The apparatus for manufacturing carbon nanohorns according to claim 1, wherein said filter includes:
a filter appendage configured to be attached to said filter.

4. The apparatus for manufacturing carbon nanohorns according to claim 1, wherein said collection mechanism further includes:
  a scraping mechanism configured to scrape said product deposited on said bottom wall portion down into said collection port.

5. The apparatus for manufacturing carbon nanohorns according to claim 4, wherein said scraping mechanism includes:
  a scraping plate configured to be attached so as to rotate around a rotational axis along a vertical direction with being in contact with said bottom wall portion.

6. The apparatus for manufacturing carbon nanohorns according to claim 4, wherein a part of said bottom wall portion, which is near said collection port, is inclined toward said collection port.

7. The apparatus for manufacturing carbon nanohorns according to claim 1, wherein said collection chamber is of a cylindrical shape having a central axis along a vertical direction.

8. The apparatus for manufacturing carbon nanohorns according to claim 1, further comprises:
  an exhaust mechanism configured to be connected to said exhaust port and to exhaust said collection chamber.

9. The apparatus for manufacturing carbon nanohorns according to claim 1, wherein said collection chamber side outlet is provided in a lower portion of said collection chamber being eccentric from a centerline of a cone of said filter.

10. The apparatus for manufacturing carbon nanohorns according to claim 9, wherein said collection chamber side outlet is provided such that said collection chamber side outlet faces a tangential direction of said filter.

11. The apparatus for manufacturing carbon nanohorns according to claim 1, wherein the inert gas flowed into the collection chamber spirally flows from the bottom wall of the collection chamber to a top of the collection chamber.

12. The apparatus for manufacturing carbon nanohorns according to claim 1, wherein the separation of the product and the collection of the carbon nanohorns is performed simultaneously.

13. The apparatus for manufacturing carbon nanohorns according to claim 1, wherein the collection mechanism collects the carbon nanohorns, that are aggregated and dropped, and deposits the carbon nanohorns below the cone-shaped filter.

14. The apparatus for manufacturing carbon nanohorns according to claim 1, wherein said separation mechanism separates said carbon nanohorns from said graphite component and said amorphous component based on a weight of said carbon nanohorns.

15. The apparatus for manufacturing carbon nanohorns according to claim 1, wherein said separation mechanism separates said carbon nanohorns from said graphite component and said amorphous component based on a mass of said graphite component and said amorphous component.

16. The apparatus for manufacturing carbon nanohorns according to claim 1, wherein said separation mechanism separates said carbon nanohorns from said graphite component and said amorphous component based on a distance of said carbon nanohorns from a predetermined point.

17. The apparatus for manufacturing carbon nanohorns according to claim 1,
  wherein said separation mechanism separates said carbon nanohorns from said graphite component and said amorphous component based on a difference between a mass of said carbon nanohorns and a mass of said graphite component and said amorphous component.

18. A method for manufacturing carbon nanorhorns, said method comprising:
  producing a product containing carbon nanohorns, a graphite component and an amorphous component by irradiating a solid carbon material with a laser beam;
  transferring said product to a collection chamber by inert gas;
  spirally moving up said inert gas in said collection chamber;

trapping said graphite component and said amorphous component of said product at an upper portion of said collection chamber; and collecting said carbon nanohorns by said inert gas spirally moving up to make said carbon nanohorns be aggregated and drop in said collection chamber, wherein said collection chamber includes:
an exhaust port; and
a cone-shaped filter configured to be provided below said exhaust port inside said collection chamber, the cone-shaped filter being arranged in a direction where a vertex of a cone of said cone-shaped filter is upward, wherein said transferring said product to a collection chamber by inert gas includes introducing said product into said collection chamber from a lower side of said exhaust port and a lower side of said filter by said inert gas such that said inert gas including said product flows into an inside of said cone-shaped filter in a direction eccentric from a centerline of said cone, wherein said spirally moving up said inert gas in said collection chamber includes spirally moving up said inert gas from a bottom of said cone-shaped filter to a top of said cone-shaped filter through the inside of said cone-shaped filter, wherein said collecting said carbon nanohorns includes collecting said carbon nanohorns from a collection port provided in a bottom wall portion of said collection chamber, and wherein said collecting including separating said carbon nanohorns from said graphite component and said amorphous component based on a traveled distance of said carbon nanohorns against a gravitational force.

19. The method for manufacturing carbon nanohorns according to claim 18, wherein said inert gas comprises argon gas.

20. The method for manufacturing carbon nanohorns according to claim 18, wherein said collection chamber includes:

a scraping mechanism configured to scrape said carbon nanohorns deposited on said bottom wall portion down into said collection port, and wherein said collecting said carbon nanohorns by said inert gas spirally moving up to make said carbon nanohorns be aggregated and drop in said collection chamber includes:

scraping said carbon nanohorns down into said collection port by driving said scraping mechanism.

21. The apparatus for manufacturing carbon nanohorns according to claim 20, wherein said scraping mechanism includes:

a scraping plate configured to be attached so as to rotate around a rotational axis along a vertical direction with being in contact with said bottom wall portion.

22. The method for manufacturing carbon nanohorns according to claim 18, wherein said collection chamber is of a cylindrical shape having a central axis along a vertical direction.

23. The method for manufacturing carbon nanohorns according to claim 18, further comprising:

exhausting said collection chamber.

24. The method for manufacturing carbon nanohorns according to claim 18, wherein said introducing said exhaust port into said collection chamber from a lower side of said exhaust port and a lower side of said filter includes:

introducing said product into said collection chamber at a lower portion of said collection chamber with being eccentric from a centerline of a cone of said filter.

25. The method for manufacturing carbon nanohorns according to claim 24, wherein said introducing said product into said collection chamber includes:

introducing said product into said collection chamber at said lower portion in a tangential direction of said filter.

* * * * *